US008315646B2

(12) United States Patent
Karjalainen (10) Patent No.: US 8,315,646 B2
(45) Date of Patent: Nov. 20, 2012

(54) POSITION-DEPENDENT CONNECTIVITY MANAGEMENT

(75) Inventor: Antti Karjalainen, Kajaani (FI)

(73) Assignee: Elektrobit Wireless Communications Oy, Oulu (FI)

( * ) Notice: Subject to any disclaimer, the term of this patent is extended or adjusted under 35 U.S.C. 154(b) by 123 days.

(21) Appl. No.: 12/937,738

(22) PCT Filed: Aug. 28, 2008

(86) PCT No.: PCT/FI2008/050476
§ 371 (c)(1),
(2), (4) Date: Oct. 14, 2010

(87) PCT Pub. No.: WO2009/153390
PCT Pub. Date: Dec. 23, 2009

(65) Prior Publication Data
US 2011/0039579 A1    Feb. 17, 2011

(30) Foreign Application Priority Data

Jun. 18, 2008  (FI) ..................................... 20085604

(51) Int. Cl.
*H04W 24/00*  (2009.01)
(52) U.S. Cl. ............... 455/456.1; 455/456.3; 455/456.6; 455/421; 455/552.1; 455/553.1
(58) Field of Classification Search ............... 455/456.1, 455/456.2, 456.3, 456.4, 456.5, 456.6, 440, 455/426.1, 422.1, 552.1, 552.2, 421
See application file for complete search history.

(56) References Cited

U.S. PATENT DOCUMENTS

| 6,711,408 | B1 * | 3/2004 | Raith .......................... 455/440 |
| 2002/0077144 | A1 | 6/2002 | Keller et al. |
| 2002/0164997 | A1 | 11/2002 | Parry |
| 2002/0198003 | A1 | 12/2002 | Klapman |
| 2004/0198388 | A1 | 10/2004 | Blitz |
| 2005/0221841 | A1 | 10/2005 | Piccionelli et al. |
| 2005/0282579 | A1 * | 12/2005 | Kim ......................... 455/552.1 |
| 2006/0014547 | A1 * | 1/2006 | Walter ....................... 455/456.1 |
| 2006/0189336 | A1 * | 8/2006 | Miyata .......................... 455/515 |
| 2008/0151842 | A1 * | 6/2008 | Tysowski et al. ............. 370/338 |

OTHER PUBLICATIONS

Ville Mottonen, International Search Report for corresponding International Application No. PCT/FI2008/050476, Mar. 5, 2009, pp. 1-3.

* cited by examiner

*Primary Examiner* — Dwayne Bost
*Assistant Examiner* — William F Rideout
(74) *Attorney, Agent, or Firm* — Hoffmann & Baron, LLP (57) ABSTRACT

A method for communication to/from a multimode terminal operable to communicate via multiple alternative communication technologies. Each region definition indicates a region name and one or more of the communication technologies and/or operating modes plus an activation range and a deactivation range for the communication technologies and/or operating modes. The multimode terminal determines its position and retrieves a stored region definition relating to the region closest to the multimode terminal's determined position. It then compares its determined position with the activation range and a deactivation range of the retrieved region definition. Based on said comparison, the multimode terminal activates and deactivates the multiple alternative communication technologies and/or operating modes indicated by the retrieved region definition.

7 Claims, 5 Drawing Sheets

POSITION-DEPENDENT CONNECTIVITY MANAGEMENT

CROSS-REFERENCE TO RELATED APPLICATIONS

This application is a National Phase application of International Application No. PCT/FI2008/050476, filed on Aug. 28, 2008, which claims priority to Finnish Patent Application No. 20085604, filed on Jun. 18, 2008, which are incorporated herein by reference.

BACKGROUND

1. Field

The invention relates to a position-dependent connectivity management and to a multimode communication device which may be a complete multimode communication terminal or a part of it.

2. Brief Description of the Related Art

In the context of the present disclosure, a multimode communication terminal means a communication terminal operable to communicate in several communication modes, wherein the several communication modes may refer to several alternative digital communication technologies and/or to different operating modes within a single communication technology. An illustrative but non-exhaustive list of such alternative communication technologies includes 2G, 3G or 4G (second, third or fourth generation) cellular mobile technologies, WLAN (Wireless Local-Area Network), WIMAX (acronym originates from "Worldwide Interoperability Microwave Access"), UWB (Ultra Wide-Band), Internet telephony, satellite telephony, Bluetooth, Wibree, Mobile IP (Internet Protocol) in wired or wireless implementations, plus various combinations of such technologies. An illustrative example of different operating modes within a single communication technology can be found in WLAN technology in which a WLAN terminal may operate in ad-hoc mode, client mode or access point mode. Within the context of the present invention, a change from one network to another, ie, inter-operator roaming, is also regarded as a change of operating mode.

The adaptability of such multimode terminals to varying communication environments causes certain problems, however. One of the problems is caused by the fact that on entry to a new environment, the multimode terminal may try to attach to several different communication networks by the several alternative communication technologies. For instance, at an airport, the terminal may display several WLAN networks, each of which advertises communication services. Use of many or all of the several WLAN networks may involve substantial tariffs. Thus it is cumbersome for the terminal user to select the most effective WLAN network. In a different scenario, the multimode terminal may display several alternative networks for selection by the user, but the user finds out that all of the networks are password-protected and none is open for public use.

The problem of determining which network to use is likely to be more acute with a growing number of available communication technologies, as the user should first decide which communication technology is to be used, and only after that he/she can choose which network to use.

SUMMARY

An object of the invention is to develop methods, systems and software products so as to alleviate one or more of the problems identified above. The object of the invention is achieved by methods, systems and software products as defined in the attached independent claims. The dependent claim and the present patent specification with its associated drawings relate to specific embodiments and variations of the invention.

An aspect of the invention is a method for communication to/from a multimode terminal operable to receive or determine position estimates for the multimode terminal and to communicate via multiple alternative communication technologies. The novel features of the inventive method relate to preparatory steps for communication, although the actual communication may be implemented via conventional technologies. The inventive method comprises defining one or more region definitions. Each region definition indicates a name of the region and one or more of the multiple alternative communication technologies plus an activation range and a deactivation range for the at least one of the multiple alternative communication technologies. The method further comprises determining the multimode terminal's position and retrieving a stored region definition relating to the region closest to the multimode terminal's determined position. The multimode terminal's determined position is compared with the activation range and a deactivation range of the retrieved region definition, and the one or more multiple alternative communication technologies indicated by the retrieved region definition are activated and/or deactivated based on the comparison.

Another aspect of the invention is a multimode communication device which may be a complete multimode terminal, or the inventive multimode communication device may form a complete multimode terminal in connection with some external modules, such as a user interface and/or connectivity unit. The multimode terminal comprises a memory for storing applications and data, and a processor for executing the stored applications. The multimode terminal also comprises an input/output section for providing a user interface and a reception/transmission circuitry for providing a communication interface to one or more communication networks. The reception/transmission circuitry comprises means for communicating via multiple alternative communication technologies. The multimode terminal further comprises positioning means for receiving or determining position estimates for the multimode terminal and its memory contains a user interface application whose execution by the processor generates a user interface for creating and storing one or more region definitions, wherein each region definition indicates a name of the region and one or more of the multiple alternative communication technologies plus an activation range and a deactivation range for the at least one of the multiple alternative communication technologies. Finally, the multimode terminal's memory further contains an activation/deactivation application whose execution directs the processor to perform the following operations: (1) determination of the multimode terminal's position; (2) retrieval of a stored region definition relating to the region closest to the multimode terminal's determined position; (3) comparison of the multimode terminal's determined position with the activation range and a deactivation range of the retrieved region definition; and (4) activation and deactivation of each of the one or more multiple alternative communication technologies indicated by the retrieved region definition based on said comparison.

Yet another aspect of the invention is a software program product for the inventive multimode communication device, wherein the software program product comprises the above-defined activation/deactivation application.

Benefits of the invention include a more streamlined entry into and exit from the various regions in which the different communication technologies are activated. By streamlining the entry into and exit from the various regions, the invention can also improve power management because the reception/transmission circuitry associated with each communication technology is activated only in locations in which that communication technology is available and useful. Without such automatic deactivation of the reception/transmission circuitry associated with inactive communication technologies, the terminal user should manually deactivate any non-needed reception/transmission circuitries. Any time the user forgets to perform such deactivation, the non-needed reception/transmission circuitries consume battery power for no useful purpose.

BRIEF DESCRIPTION OF THE DRAWINGS

In the following the invention will be described in greater detail by means of specific embodiments with reference to the attached drawings, in which.

DETAILED DESCRIPTION

It was stated earlier that a multimode communication device according to the invention is capable of communicating in several communication modes, which may refer to alternative communication technologies and/or to different operating modes within a single communication technology. In order to keep the description of the specific embodiments reasonably compact, most of the following description relates to embodiments capable of changing the communication technology being used, because the such descriptions can be easily applied to changes of operating modes within a single communication technology.

Figure 1:
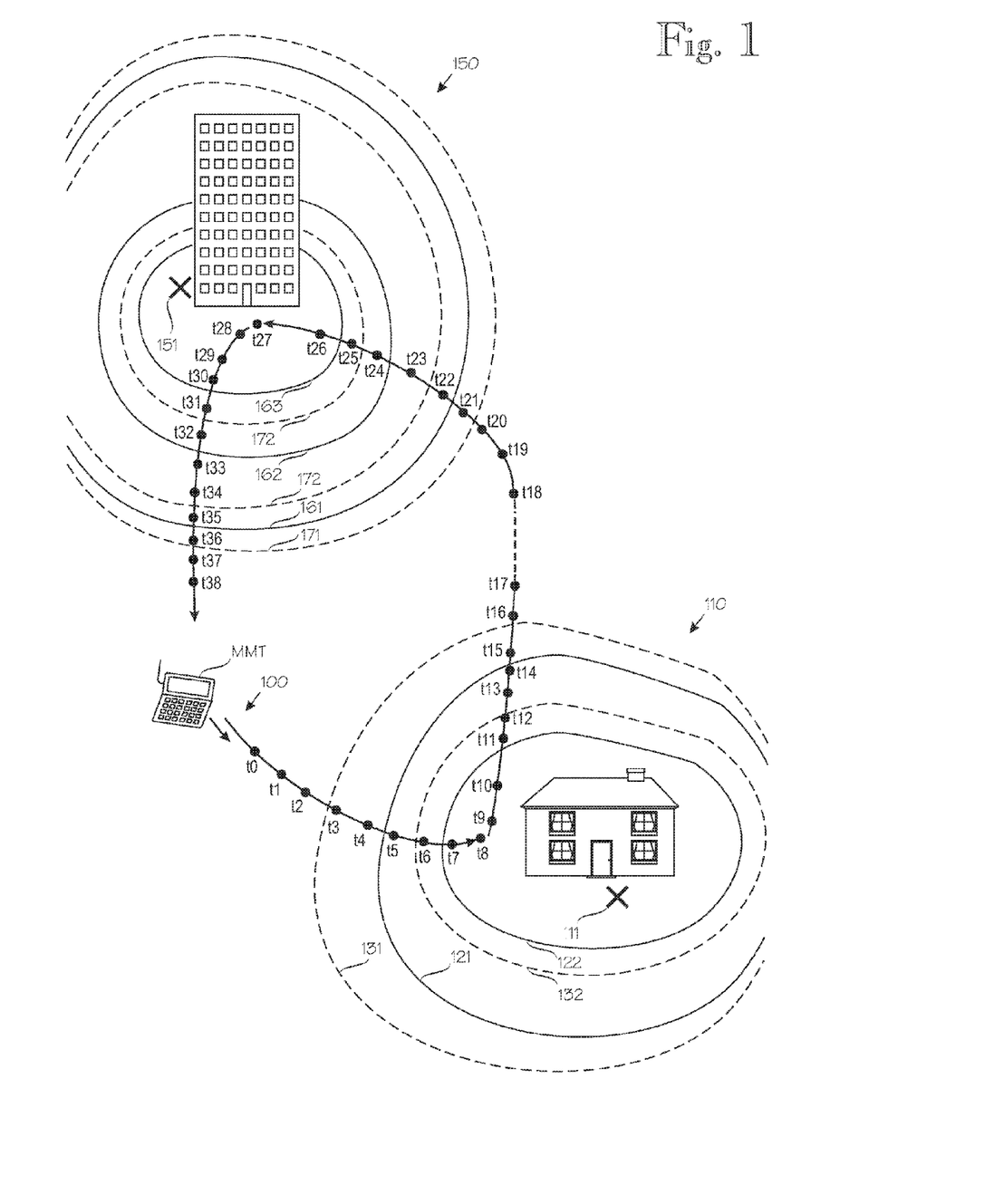
FIG. 1 illustrates an operating principle of the invention.

FIG. 1 illustrates an operating principle of the invention. Reference numeral 100 denotes a schematically drawn route of a multimode terminal. Reference signs t0 through t38 denote various instances of time, such that time instance tm occurs after time instance to if m>n. The multimode terminal is operable to use several (at least three) alternative communication technologies, which will be denoted by symbols CT1 through CT3. Reference numerals 110 and 150 denote two regions for which configurations have been defined beforehand. FIG. 1 has been drafted under the non-restricting assumption that regions 110 and 150 are the terminal user's home and office respectively. Irregular areas drawn with solid lines depict activation regions of communication technologies, while areas drawn with dashed lines depict deactivation regions of the communication technologies. Reference numerals 121 and 122 denote the activation ranges of respective communication technologies CT1 and CT2, while reference numerals 131 and 132 respectively denote the deactivation ranges of the communication technologies CT1 and CT2. In some implementations of the invention, the activation ranges 121 and 122, as well as the deactivation ranges 131 and 132 are defined on the basis of a reference point denoted by reference numeral 111, although it is possible to define the activation and deactivation ranges on the basis of multiple reference points or without any reference points, as will be shown in detail in connection with FIG. 2.

Likewise, the office 150 is associated with a reference point 151, which is surrounded by activation ranges 161, 162 and 163 of respective communication technologies CT1, CT2 and CT3, as well as their respective deactivation ranges 171, 172 and 173. An attempt has been made to keep FIG. 1 simple by assuming that the communication technologies defined for the home area 110 are a subset of the communication technologies defined for the office area 150 and that the order of activation and deactivation are the same (although communication technology CT3 is not used in the home area 110). The invention is not restricted to such simplistic assumptions, however.

The description of the operation of the multimode terminal begins at time instance t0, when the multimode terminal is outside of any of the regions 110, 150. At each of the time instances t0 through t38, the multimode terminal obtains an updated position information. For instance, the multimode terminal may contain an integrated satellite positioning device, or it may be operatively coupled to a positioning device. In a yet further implementation, the multimode terminal may comprise an integrated positioning device which is used outside the terminal user's car, but inside the car, the multimode terminal couples to the car's integral navigation system.

At time t0, when the multimode terminal is completely outside any predefined ranges around the home region 110 or office region 150, it notes that the home region 110 is the closest region for which a configuration data set exists. The multimode terminal loads the configuration data set for the home region 110, which indicates the communication technologies to be activated on approach to the home region 110, as well as the activation and deactivation ranges for each communication technology.

At times t1 and t2 the multimode terminal is still completely outside any predefined ranges around the home region 110, and no further action is taken. At times t3 and t4 the multimode terminal is within the outermost deactivation range 131, which is the deactivation range of communication technology CT1. But since the multimode terminal has not reached either of the activation ranges 121, 122, no change to the active position-dependent communication technologies is made until time t5, when the multimode terminal notes that it is within the outermost activation range 121, which is the activation range of communication technology CT1. Accordingly, the multimode terminal activates the communication technology CT1. In the example shown in FIG. 1, CT1 is the first position-dependent communication technology to be activated on entry to the home region 110. In addition to the position-dependent communication technologies CT1 through CT3, the multimode terminal may use one or more omnipresent communication technologies, such as conventional cellular mobile networks. In an analogous manner, at time t7, when the multimode terminal detects that it is within the innermost activation range 122, the multimode terminal activates the second one of the position-dependent communication technologies, namely CT2.

In connection with the activation of any of the position-dependent communication technologies CT1 through CT3, the multimode terminal may check if the communication technology being activated is associated with any applications or application tasks which should be activated after the corresponding communication technology has been activated.

For instance, in one illustrative but non-restrictive scenario, the multimode terminal may be part of the car's built-in entertainment system and one of the position-dependent communication technologies, such as CT2, may be a WLAN network. As soon as the user's car is within the activation range of the WLAN network, the multimode terminal may activate the WLAN network, which is an example of a position-dependent communication technology, plus a content-downloading application that requires several application tasks, such as downloading a program guide and comparing the downloaded program guide with the user's pre-stored list of interesting topics.

Let us assume that at times t8, t9 and t10, the multimode terminal remains within the operating range of communication technology CT2 long enough for the completion of the content downloading application and related application tasks.

At time t11, the multimode terminal has exited the activation range 122 of communication technology CT2, but no change to the active communication technologies is made until time t13, when the multimode terminal detects that it is outside the deactivation range 132 of communication technology CT2. Similarly, at time t16 the multimode terminal detects that it is outside the deactivation range of CT1 and deactivates CT1. At times t16 through t23, the multimode terminal may again communicate via one or more omnipresent or position-independent communication technologies, but this is not a restrictive assumption. Before deactivating any of the communication technologies, the multimode terminal terminates any ongoing applications or application tasks which rely on the communication technology to be deactivated.

Around the office area 150, the operation of the multimode terminal is analogous with its operation around the home area 110, apart from the fact that three different communication technologies CT1, CT2 and CT3 are defined for the office area.

Figure 2:
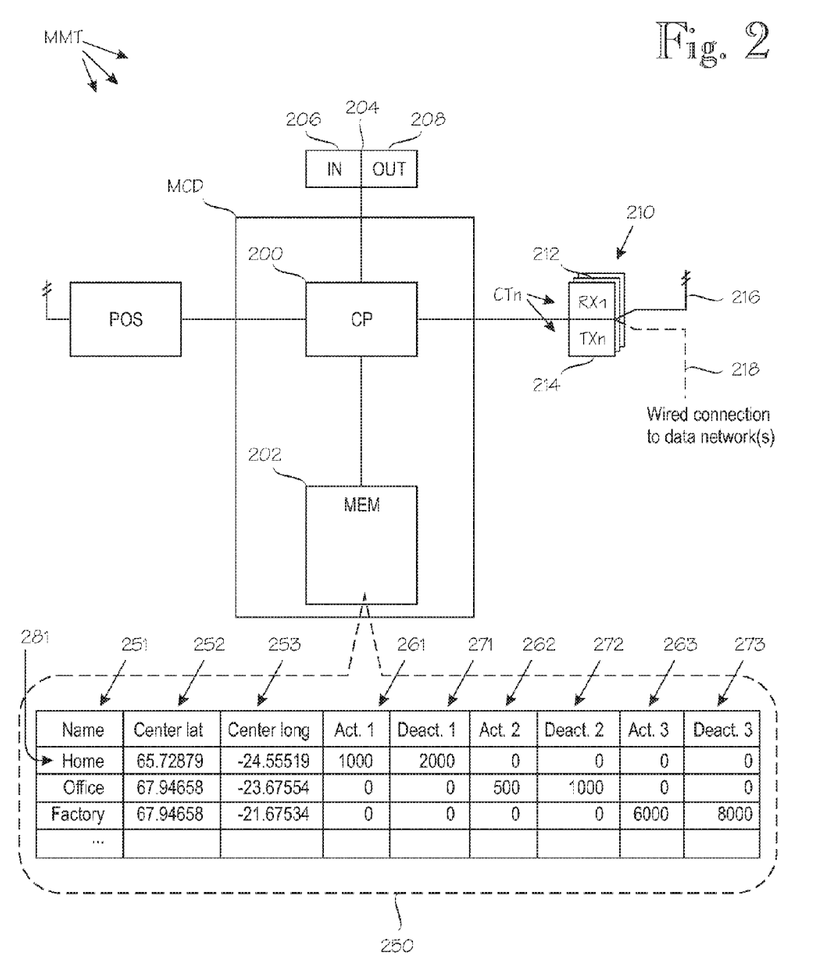
FIG. 2 is a schematic block diagram of a representative multimode terminal.

FIG. 2 is a schematic block diagram of a representative multimode communication device MCD which, as stated above, can be a complete multimode terminal MMT or a part of it, such that the inventive multimode communication device MCD is operable to utilize one or more external modules. The multimode communication device MCD comprises a central processing unit (CPU) 200 and memory 202. In addition, the multimode communication device MCD comprises or utilizes external input-output circuitry 204 which constitutes the multimode terminal's user interface and comprises an input circuitry 206 and an output circuitry 208. The multimode communication device MCD further comprises or utilizes external reception/transmission circuitry 210 which comprises a transmission circuitry 212, reception circuitry 214 and antenna 216. Instead of the antenna 216 or in addition to it, the reception/transmission circuitry 210 may comprise interface means 218 for wired connectivity to one or more data networks. At this level of generalization, all elements 200 through 214 can be conventional as used in the relevant art.

In order to support multiple alternative communication technologies, the multimode communication device MCD comprises or utilizes an external reception circuit RXn and a transmission circuit TXn for each communication technology CTn. Each communication technology CTn can be individually activated or deactivated by the central processing unit 200. In one specific implementation, the multimode terminal may be based on Software-Defined Radio technology (SDR), in which case the individual activations and deactivations can be performed as changes of operating mode in the SDR terminal. For example, in the SDR-based implementation, one operating mode of the multimode terminal can be 2G communication, while other operating modes include 3G, WLAN, etc. In some implementations the terminal can also be a so-called cognitive radio. As used herein, a cognitive radio means spectrum-sensitive or spectrum-adaptable radio technologies whose main functions include detection of unused spectrum portions and sharing them with others; spectrum management, including analysis and decision; spectrum mobility (dynamic change of operating frequency). In implementations based on SDR or cognitive radio, a location-specific software and/or configuration data set can be loaded into the radio-frequency parts, which causes the inventive reconfiguration of the terminal's radio radio-frequency parts.

The multimode communication device MCD further comprises or utilizes an external positioning device or section POS for obtaining position information which indicates the multimode terminal's position. The positioning device may utilize a satellite positioning system, such as GPS (Global Positioning System). In some embodiments the actual positioning device POS is external to the multimode communication device MCD, as shown in FIG. 2, and the multimode communication device MCD comprises an interface to the actual positioning device POS. For instance, the multimode communication device MCD may have an interface to a vehicle's on-board navigation system, which in this case implements the positioning device POS. In other embodiments the multimode communication device MCD may actually contain the positioning device POS. In a hybrid embodiment, the multimode communication device MCD may contain a positioning device POS of its own, but is able to couple to an external navigation system when one is available. In an alternative or supplementary implementation, the multimode communication device may obtain its position estimate from the network. Such network-generated position estimates may be based on network cell identifiers and/or triangulation via multiple base stations, as is well known in the art.

In some embodiments the positioning device or section POS comprises a primary positioning system and a secondary positioning system, such that the secondary positioning system is used in situations when the primary positioning system is unavailable. For instance, the primary positioning system may employ satellite-based positioning or network-based triangulation which are unavailable in buildings, tunnels or in narrow streets between high buildings. In a simple implementation the secondary positioning system is based on the assumption that the motion of the multimode terminal MMT (or a person or vehicle carrying it) continues without changes when the primary positioning system becomes unavailable. In other words, the estimated position=(latest position obtained via the primary positioning system)+(time after the primary positioning system became unavailable)*(velocity at time when the primary positioning system became unavailable).

In a more ambitious implementation the secondary positioning system may be based on an acceleration transducer for each of two or three orthogonal axes (x, y, (z)), wherein the estimated position=(latest position obtained via the primary positioning system)+(double integral of the two or three accelerations over the time after the primary positioning system became unavailable).

Many other implementations are also possible. For instance, the multimode terminal may be integrated into the vehicle in the form of a connectivity unit or telematic unit. As used herein, a connectivity unit differs from the representative multimode terminal MMT shown in FIG. 2 in that a connectivity unit needs no user interface of its own. Instead the connectivity unit may offer the multiple alternative communication technologies to a separate, detachable device which implements the user interface. Such a separate, detachable user interface device can be virtually any data processing device, such as smart telephone, a pocket or laptop computer or the like. For example, the connectivity unit may be coupled to the detachable user interface device via a docking cradle, cable (such as USB), Bluetooth connection or the like. A telematic unit, in turn means a multimode terminal with additional functionality, such as remote diagnostics, traffic control systems, vehicle tracking, road toll collection. It is impossible to enumerate all the various implementations of the multiple alternative communication technologies, but it should be noted that the invention is not restricted to stand-alone terminals with integrated user interfaces and/or positioning devices.

For use in vehicles, the multimode terminal with its associated positioning device may be divided into multiple physically separate but operationally inter-connected main sections, such that the user interface, including the display and input unit plus an optional speaker and/or microphone can be detachably or fixedly positioned in or near the vehicle's dashboard, the positioning device and the antennas may be positioned so as to achieve an optimal satellite reception and communication, while the processor and memory can be positioned so as to provide a maximum protection against accidents, theft or vandalism.

Hybrid approaches are also possible, such that some modes are implemented by means of SDR technology while others are implemented in more traditional, hardware-based technologies. In yet another implementation, the multimode terminal may comprise several radio devices which are independent from one another but are controlled by a common control or computing unit which executes the logic according to the invention and receives the position information from the positioning device POS.

In addition to the conventional sections, the memory 202 of the multimode terminal contains a data structure, generally denoted by reference numeral 250, which defines the regions (cf. regions 110, 150 in FIG. 1) for which specific configuration data sets exist, as well as the configuration data sets. In the exemplary and non-restrictive implementation shown in FIG. 2, the data structure 250, which is organized as table of columns and rows, contains a name column 251, a center point indicated as latitude 252 and longitude 253 (with a negative value indicating eastern longitudes). The embodiment shown in FIG. 2 is based on the non-restrictive assumption that the multimode terminal MMT contains three position-dependent communication technologies CT1 to CT3. Accordingly, the data structure 250 further contains an activation radius 261, 262 and 263 plus a deactivation radius 271, 272 and 273 for each of the three position-dependent communication technologies CT1 to CT3. For example, the first row 281 indicates that the center point for a region named "Home" is at 65.72879° N, 24.55519° E. Communication technology CT1 will be activated within a 1000-meter radius from the center point and deactivated when the multimode terminal MMT is more than 2000 meters from the center point. The remaining position-dependent communication technologies CT2, CT3 will not be used in this region. On the other hand, the second position-dependent communication technology CT2 will be activated within a 500-meter radius from the center point of region "Office" and deactivated when the distance to the center point exceeds 1000 meters. Finally, the third position-dependent communication technology CT3 will be activated within a 6000-meter radius from the center point of region "Factory" and deactivated when the distance to the center point exceeds 8000 meters. By way of example, the three position-dependent communication technologies CT1, CT2 and CT3 may be WLAN, UWB and Mobile WIMAX, but this is only an illustrative example, and the ellipsis on the fourth row suggests that the data structure 250 is not restricted to three position-dependent communication technologies.

There are various techniques for defining the region definitions in the data structure 250, such as the region definition 281 for the region "Home".

Figure 3A:
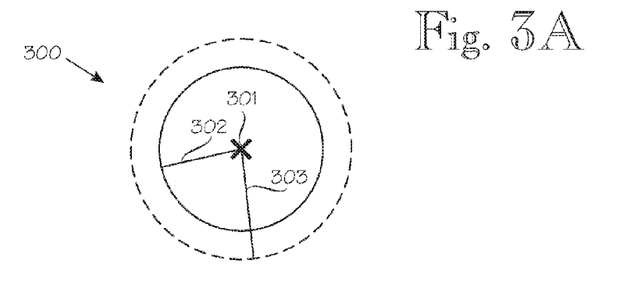
FIGS. 3A through 3D illustrate various embodiments for defining regions.

In one implementation the region definitions may be defined via a user interface window generated by the multimode terminal itself, such that the terminal user defines the region definitions via the user interface window. In another implementation the network operator(s) may transmit such region definitions or templates for region definitions. Alternatively, the network operators may offer the region definitions for downloading via their web sites. As used herein, a template means that the user may need to customize the region definitions him/herself. For example, multiple network operators may transmit the region definitions for frequently-visited regions, such as shopping centres, airports or the like. In this scenario, the operator-transmitted region definitions may include the activation and deactivation ranges compatible with the operators' networks and typical terminals, but individual users may have or wish to fine-tune the activation and deactivation ranges themselves. The two implementations can be combined such that some of the region definitions are defined from scratch via the multimode terminal's user interface, some are transmitted by operators or downloaded from their web sites, and yet others are initially transmitted or downloaded and fine-tuned by terminal users. Yet further, the multimode terminal may be able to learn from the user's activation/deactivation habits. For example, if the user activates WLAN communication at home and deactivates it elsewhere, the terminal may automatically learn such a region definition and offer it for the user for acceptance. The user may customize the automatically-learned region definition afterwards, for example by including a region name and by fine-tuning the activation/deactivation ranges FIGS. 3A through 3D illustrate various embodiments for defining regions. FIG. 3A shows an embodiment in which a circular region 300 is defined on the basis of a center point 301 plus an activation radius 302 and a deactivation radius 303 for each of the position-dependent communication technologies. Alternatively, in an embodiment which is restricted to one position-dependent communication technology, the data structure 250 (see FIG. 2) may indicate which communication technology will be used at the region 300, plus one activation radius 303 and one deactivation radius 303.

A certain degree of hysteresis is provided by setting the deactivation radius 303 greater to the activation radius 302. The hysteresis prevents frequent activation and deactivation of the position-dependent communication technologies. A slight drawback caused by the hysteresis is that on approach to the region 300, the area between the deactivation radius 303 and the activation radius 302 cannot be used. However, the hysteresis can be quite small if the positioning system POS (see FIG. 2) being used is a satellite positioning system, such as GPS, whose positioning error is quite small, such as 10 to 20 meters. The spatial hysteresis (deactivation radius greater than the activation radius) can be eliminated altogether if a time hysteresis is used. This means that the activation radius can equal the deactivation radius, and the activation and deactivation take place after the multimode terminal has been inside or outside, respectively, of the activation/deactivation radius for a predetermined period of time, which may range from about 30 seconds to a few minutes.

Figure 3B:
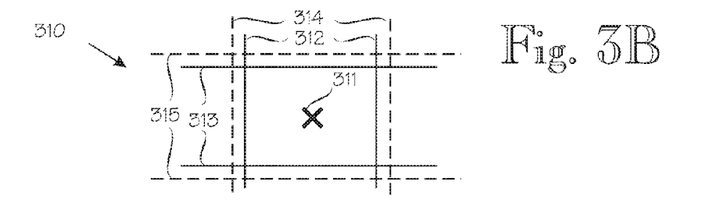

FIG. 3B shows an embodiment in which a rectangular region 310 is defined on the basis of a latitude window and longitude window around a center (nominal) point 311. Reference numerals 312 and 313 denote the longitude and latitude windows for activation, while reference numerals 314 and 315 denote the longitude and latitude windows for deactivation.

Figure 3C:
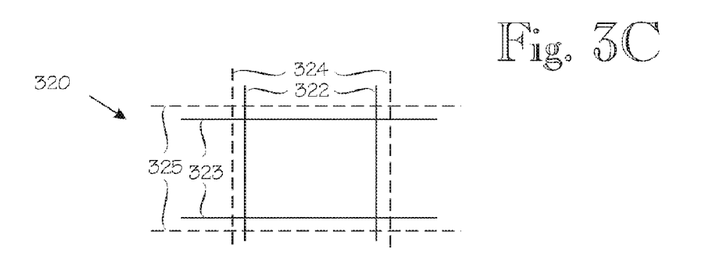

FIG. 3C shows an embodiment in which a rectangular region 320 is defined on the basis of longitudes and latitudes, without any reference point. Reference numeral 322 denotes a pair of longitudes, while reference numeral 323 denotes a pair of latitudes, such that the position-dependent communication technology associated with them is activated when the multimode terminal notes it is between the pair of longitudes 322 and the pair of latitudes 323. Reference numerals 324 and 325 denote the deactivation longitudes and latitudes, such that the position-dependent communication technology will be deactivated when the multimode terminal notes it is no longer between the between the pair of longitudes 324 or the pair of latitudes 325.

It was stated in connection with FIGS. 3A through 3C that the region 300 is circular and the regions 310 and 320 are rectangular. This is only an approximation, and the precise shape of the regions depends on the projection system used to prepare the maps. Slight deviations from geometrically perfect shapes will in no way affect the operation of the invention, however.

Figure 3D:
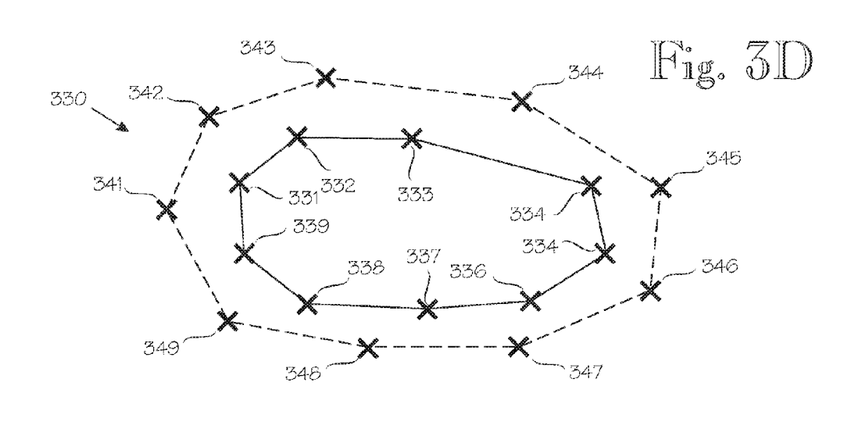

FIG. 3D shows how a region 330 of an arbitrary shape can be defined by means of two polygons for each position-dependent communication technology. Reference numerals 331 through 339 denote border points that define an activation region for a position-dependent communication technology, while reference numerals 341 through 349 denote border points that define the corresponding deactivation region. As stated in connection with FIG. 3A, a single polygon can be used for activation and deactivation, if a time hysteresis is utilized.

A benefit of the embodiment shown in FIG. 3A is that the circular region 300 is very easy to define. Assuming that a navigation system will be used, the navigation system's position cursor can be positioned over the region's center point, and the activation and deactivation radii can be defined. On the other hand, the embodiment shown in FIG. 3A suffers from the drawback that the position-dependent communication technology should provide omni-directional coverage, otherwise some sectors of the communication technology will be poorly utilized. The embodiment shown in FIG. 3D is precisely the opposite in that maximum flexibility is available for defining the region 330. A drawback is naturally the labour overhead in defining the region via the multiple border points.

Figure 4A:
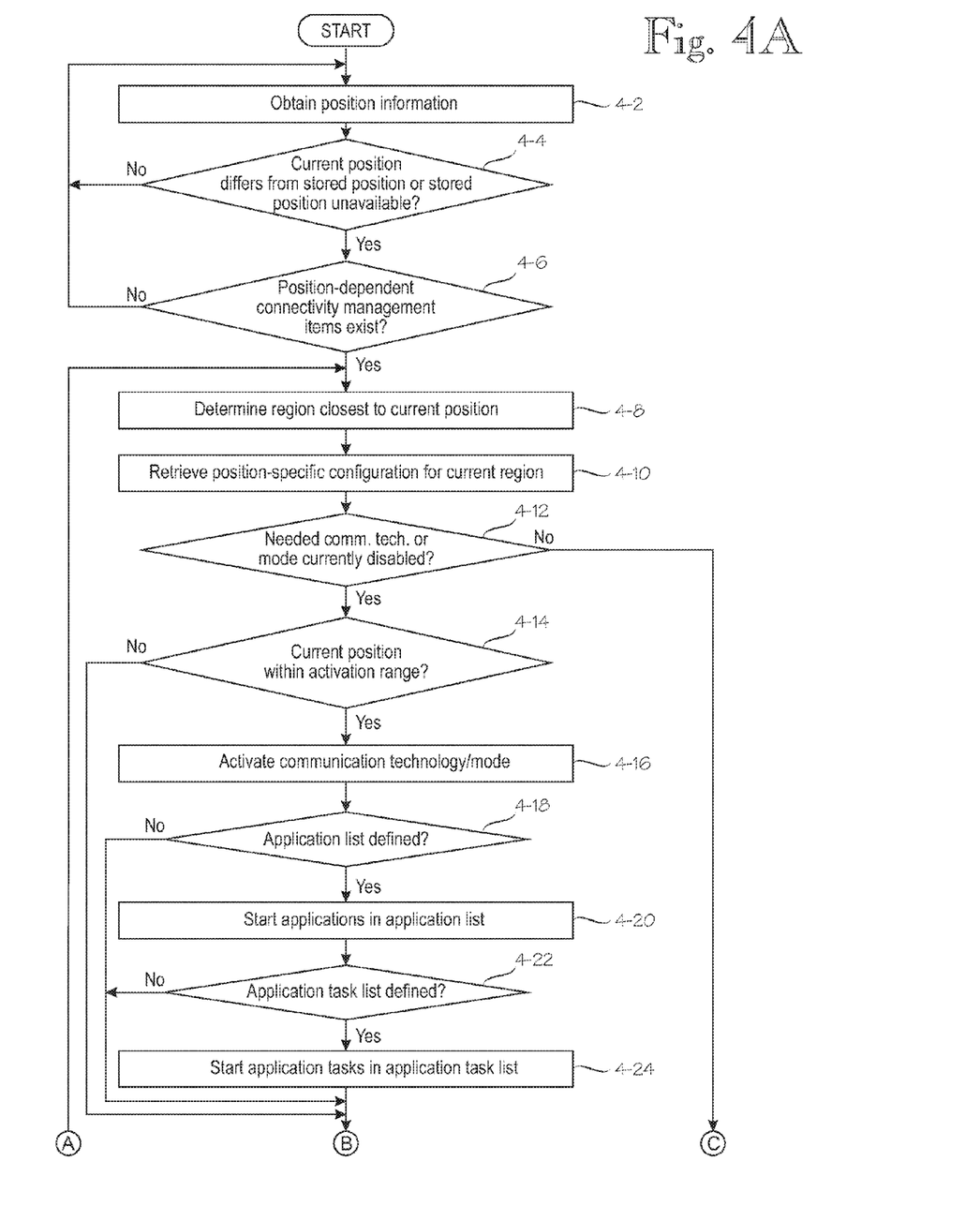
FIGS. 4A and 4B, which form a single logical drawing, show a flowchart illustrating the operation of an embodiment of the invention.
Figure 4B:
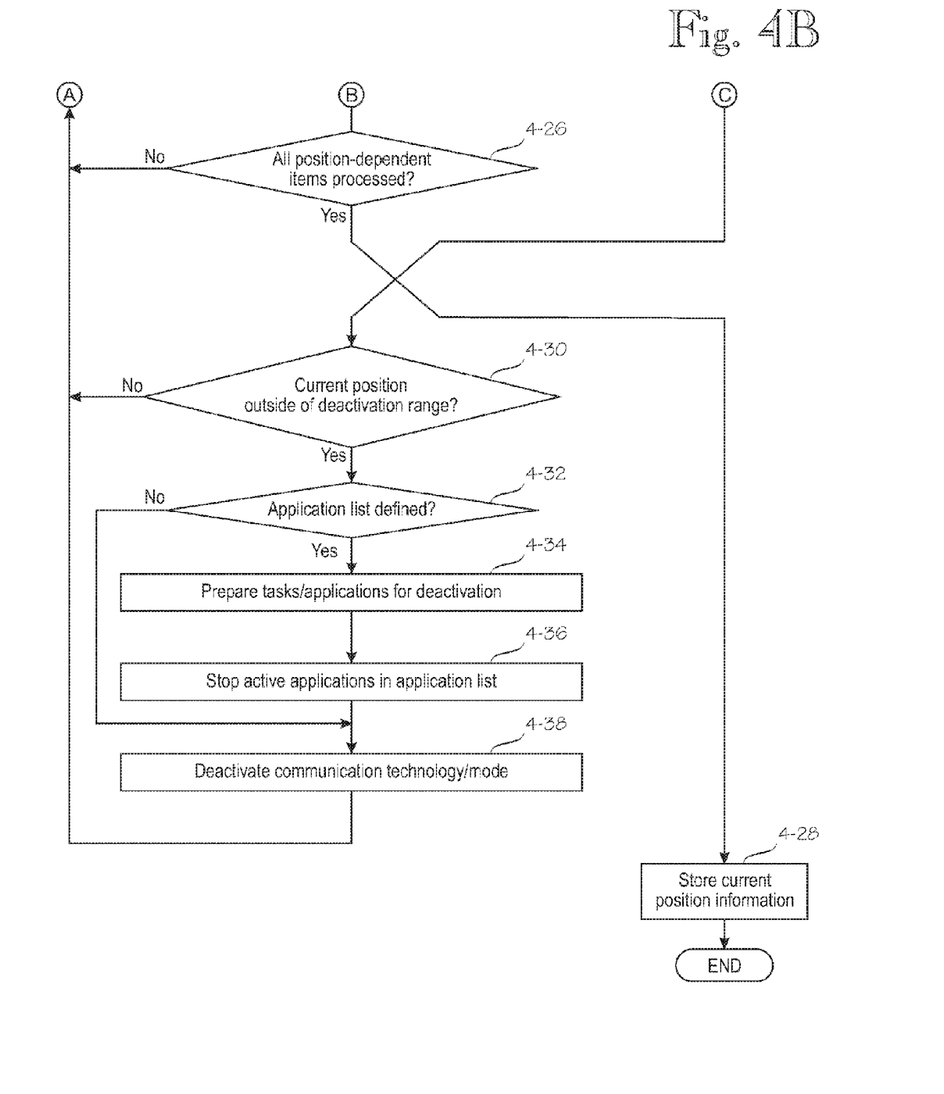

FIGS. 4A and 4B, which form a single logical drawing, show a flow-chart illustrating the operation of an embodiment of the invention. The flow-chart begins at step 4-2, in which the multimode terminal MMT obtains position information which serves as the multimode terminal's position estimate or can be used to determine the position estimate. Specific embodiments for determining the position estimate were described in connection with FIG. 2. In step 4-4 the multimode terminal checks whether the current position estimate differs from the previous stored position estimate. If not, the process returns to step 4-2. If yes, or if no previous position estimate has been stored, the flow-chart proceeds to step 4-6, in which the multimode terminal checks if position-dependent connectivity management items exist. A position-dependent connectivity management item is an item which relates to the multimode terminal's connectivity and is to be managed depending on the multimode terminal's position. Examples of such position-dependent connectivity management items are the reception/transmission circuitries associated with the position-dependent communication technologies plus applications and application tasks associated with the position-dependent communication technologies. If no position-dependent connectivity management items exist, the process returns to step 4-2. In such a case the loop consisting of steps 4-2 through 4-6 may seem like an endless loop with no break-away options, but the user of the multimode terminal may configure position-dependent connectivity management items in the future, for example by changing the data structures 250 described in connection with FIG. 2.

If any position-dependent connectivity management items exist, the process continues to step 4-8 in which the multimode terminal determines which predefined region is closest to its current position estimate. In step 4-10 the multimode terminal retrieves the position-specific configuration data for the closest predefined region, such as the data structure 250, which includes the one or more communication technologies to be activated on entry to the region. The configuration data also includes the activation range and deactivation range for any communication technology to be activated. In step 4-12 the multimode terminal checks if any communication technology needed in the current region is disabled. If yes, the multimode terminal executes step 4-14 in which it checks, for each needed communication technology or operating mode at a time, whether the multimode terminal's current position estimate is within the needed communication technology or operating mode, as was described in connection with FIGS. 3A through 3D. If the current position estimate is outside the activation range, the process returns to step 4-8.

On the other hand, if in step 4-14 the current position estimate is within the activation range, the currently-processed communication technology and/or operating mode is activated in step 4-16. Illustrative acts for activating a communication technology and/or operating mode will be described later, near the end of this description.

Then, in step 4-18, the multimode terminal checks if any application list is defined for the recently-activated communication technology. If yes, such application(s) will be activated in step 4-20. Steps 4-22 and 4-24 comprise checking if any application tasks are defined for the recently-activated communication technology. If yes, such application tasks are activated also.

In step 4-26 the multimode terminal checks if all position-dependent connectivity management items have been processed. If not, the process returns to step 4-8. If yes, the process continues to step 4-28, which comprises storing the current position estimate, after which the process ends. Ending the process does not mean that the operation of the multimode terminal ends; rather it means that the activation/deactivation of position-dependent connectivity management items ends, after which the terminal may perform other functions, until the next execution of the process shown in FIGS. 4A and 4B. Such other functions may include updating the region definitions and/or normal communication.

If in step 4-12 no needed communication technology was disabled, the multimode terminal executes steps 4-30 through 4-38 which relate to deactivation of position-dependent communication technologies. In step 4-30 the multimode terminal checks if its current position estimate is outside the deactivation range of any active position-dependent communication technology. If no, the process returns to step 4-8. If yes, the multimode terminal proceeds towards step 4-38 in which the position-dependent communication technology and/or operating mode is deactivated. However, in some embodiments the deactivation step 4-38 is preceded by optional steps 4-32 through 4-36 which relate to a graceful deactivation of the position-dependent communication technologies. In step 4-32 the multimode terminal checks if any applications are pre-configured for execution in connection with the communication technology, or if any applications depending on the soon-to-be-deactivated communication technology are running. If yes, the multimode terminal performs step 4-34 in which such applications and their related tasks are prepared for deactivation. For instance, non-critical data transfers may be suspended until the next activation of the soon-to-be-deactivated communication technology (or other communication technology compatible with the soon-to-be-deactivated application). In connection with critical applications, such as financial transactions, the multimode terminal may generate a user interface dialog to alert the user that a critical application is about to be interrupted, in which case the user may take any corrective action, such as stopping the vehicle, for instance, until the application or application task has been completed. When the applications and tasks have been successfully prepared for deactivation of the communication technology, the applications and tasks will be stopped, after which the communication technology can be smoothly deactivated in step 4-38.

The embodiment shown in FIGS. 4A and 4B can be further enhanced to support handover between the various communication technologies. In connection with step 4-16, when a communication technology has been successfully activated, the multimode terminal may search for any ongoing connections, such as voice calls, data calls, internet sessions or the like, and hand over any such ongoing connections to the recently-activated communication technology. If there are no ongoing connections which rely on previously-activated communication technologies, or if all ongoing connections have been successfully handed over to the recently-activated communication technology, the previously-activated communication technologies can be deactivated in the interest of saving communication resources and/or battery power. Hysteresis may be applied similarly to the embodiments described in connection with FIGS. 3A through 3D.

Execution of the optional steps 4-32 through 4-36, which provide smooth deactivation of communication technologies, can be supported by means of predefined deactivation options, which may include options like: "always", "user-confirmed", "when no active data transfer" and "after handover between communication technologies". An indication of a selected deactivation option may be associated with each communication technology (as an extension of the data structure 250 shown in FIG. 2) or with each application stored in the multimode terminal. In the former implementation, all applications are deactivated similarly, while the latter implementation supports application-specific deactivation options. For instance, watching television may be deactivated via option "always", while a banking application may require the option "after handover between communication technologies".

It was stated in connection with steps 4-16 and 4-38 that some of the available communication technologies and/or operating modes are activated or deactivated, respectively. The following is an illustrative but non-exhaustive list of such activation/deactivation acts, one or more of which may be performed when a communication technology and/or operating mode is activated or deactivated:

A selection of a communication technology from among multiple communication technologies, including but not limited to 2G, 3G or 4G cellular mobile technologies, WLAN, WIMAX, UWB (Ultra Wide-Band), Internet telephony, satellite telephony, Bluetooth, Wibree, plus various combinations of such technologies, such as Mobile IP over WLAN.

A selection of operating mode within a single communication technology; an illustrative example can be found in WLAN technology wherein a WLAN terminal may operate in ad-hoc mode, client mode or access point mode.

Selective parameter activation in Software-defined Radio technology (SDR), in which case individual activations and deactivations can be performed as changes of operating mode in the SDR terminal. For example, in an SDR-based implementation, one operating mode of the multimode terminal can be 2G communication, while other operating modes include 3G, WLAN, etc.

Selection, activation and/or loading of new software for programmable RF parts for a different communication technology.

A selection of a network within the selected communication technology (inter-operator or other type of roaming);

A selection of traffic parameters, such as packet-switched or circuit-switched operation;

A selection of communication speed/bandwidth and/or quality of service (QoS) parameters;

A selection of a pairing from among multiple predefined pairings of short-range communication devices, such as Bluetooth devices;

Selection of master/slave mode, etc;

Selection of a radio frequency variant within a selected communication technology, eg GSM 900 MHz;

Selection of data settings, eg access point for packet data;

Selection of an active user profile, eg user name, password etc.;

Selection of active communication security parameters, eg firewall settings, MAC address filtering, NAT router, WEP/WPA2 encryption settings, etc.;

Selection of transmission power within a selected communication technology;

Selection of service provider(s);

Selection of user status for service(s);

Selection of communication protocol(s);

Selection of IP address;

Selection of VPN parameters;

Selection of TCP/IP port;

Selection of active services with a selected communication technology;

Selection of active restrictions for call barring, eg. all outgoing calls, all outgoing international calls, all outgoing international calls except calls outgoing to domestic network, all incoming calls, etc.;

Selection of active settings for call forwarding;

Selection of active settings for voice mail box;

Selection of a sound alert (ringing tone) for an active communication technology;

Selection of active settings for a mailbox;

Selection of an active subscriber id within a selected communication technology;

Selection of an active contact list;

Selection of a packet data service mode;

Selection of active speed dialling settings/numbers;

Selection of active settings for call divert;

Selection of active settings for sending caller ID;

Selection of a preferred network list;

Selection of a network server;

Selection of an active device name and address;

Selection of active device management settings, eg for updating communication software/firmware, etc.
Selection of active voice and/or video codecs
Selection of LAN settings, eg automatic configuration or proxy server (address and port, servers, exceptions);
Selection of an active home page;
Selection of internet content and/or service providers;
Selection of encryption mode, eg WEP, TKIP or AES;
Selection of Internet protocol, eg IPv4 or IPv6;
Selection of SSID;
Selection of UPnP functionality, eg active or inactive status;
Selection of a wireless channel:
Selection of method for acquiring IP address, eg acquire IP address automatically from a DHCP Server, use PPPoE client, use IP unnumbered, use static IP address and subnet mask;
Selection of default gateway
Selection of DNS Name server
Selection of domain name
Selection of routing information settings, eg in case of WLAN access point mode;
Selection of packet filter settings;
Selection of data traffic/communication monitoring settings;
Selection of system mode lock settings, eg in case of cellular terminal, examples: Automatic, GSM, UMTS, etc.;
Selection of active configuration for radio-frequency parts, eg in case of cognitive radio, examples: used radio spectrum, spectrum sensing functions, spectrum management functions, spectrum Mobility functions, spectrum Sharing functions, equalization, filtering, interference management, resource allocation, algorithms, etc.

It is readily apparent to a person skilled in the art that, as the technology advances, the inventive concept can be implemented in various ways. The invention and its embodiments are not limited to the examples described above but may vary within the scope of the claims.

What is claimed is:

1. A method for communication with a multimode terminal operable to receive or determine position estimates for the multimode terminal and to communicate via multiple alternative communication technologies and/or operating modes, the method comprising:
utilizing a user interface application whose execution in the multimode terminal generates a user interface for creating and storing one or more region definitions, wherein each region definition includes a name of the region and a list of at least one of the multiple alternative communication technologies and/or operating modes plus an activation range and a deactivation range for the at least one of the multiple alternative communication technologies and/or operating modes;
determining a position of the multimode terminal;
retrieving a stored region definition relating to the region closest to the position of the multimode terminal;
comparing the position of the multimode terminal with the activation range and deactivation range of the retrieved region definition;
activating and deactivating at least one of the multiple alternative communication technologies and/or operating modes indicated by the retrieved region definition based on the comparison; and
implementing a time hysteresis, wherein said activation of at least one of the multiple alternative communication technologies and/or operating modes takes place only after the multimode terminal has been inside the activation range for a first predetermined period of time, and deactivation of at least one of the multiple alternative communication technologies and/or operating modes takes place only after the multimode terminal has been outside the deactivation range for a second predetermined period of time.

2. A method according to claim 1, wherein at least one of the region definitions indicates a set of applications for the one or more of the multiple alternative communication technologies and/or operating modes indicated by the region definition, and the method further comprises automatically starting the indicated set of applications.

3. A method according to claim 2, wherein at least one of the region definitions indicates a set of application tasks for at least one application in the indicated set of applications, and the method further comprises automatically starting the indicated set of application tasks.

4. A method according to claim 1, wherein the act of deactivating each of the one or more multiple alternative communication technologies and/or operating modes is preceded by checking if any active application uses the communication technology and/or operating mode to be deactivated, and preparing such applications for smooth deactivation.

5. A method according to claim 1 wherein, for any of the multiple alternative communication technologies and/or operating modes, the deactivation range is larger than the activation range.

6. A multimode communication device, comprising:
a memory for storing applications and data;
a processor for executing the stored applications;
an input/output section for providing a user interface;
reception/transmission circuitry for providing a communication interface to one or more communication networks, wherein the reception/transmission circuitry communicates via multiple alternative communication technologies and/or operating modes; and
positioning means to receive or determine position estimates for the multimode communication device, the memory comprising a user interface application, execution by the processor of which, generates a user interface to create and store one or more region definitions, wherein each region definition includes a name of the region and a list of at least one of the multiple alternative communication technologies and/or operating modes plus an activation range and a deactivation range for the at least one of the multiple alternative communication technologies and/or operating modes, the memory further comprising an activation/deactivation application, execution of which, directs the processor to perform the following operations:
determination of a position of the multimode communication device;
retrieval of a stored region definition relating to a region closest to the position of the multimode communication device;
comparison of the position of the multimode communication device with the activation range and deactivation range of the retrieved region definition;
activation and deactivation of at least one of the multiple alternative communication technologies and/or operating modes indicated by the retrieved region definition based on the comparison; and
implementation of a time hysteresis, wherein said activation of at least one of the multiple alternative communication technologies and/or operating modes takes place only after the multimode terminal has been inside the activation range for a first predetermined period of time, and deactivation of at least one of the multiple alternative communication technologies and/or operating modes takes place only after the multimode terminal has been outside the deactivation range for a second predetermined period of time.

7. A non-transitory computer-readable storage medium comprising encoded instructions for a multimode communication device, which multimode communication device comprises:

a memory for storing applications and data;

a processor for executing the stored applications;

an input/output section for providing a user interface;

reception/transmission circuitry for providing a communication interface to one or more communication networks, wherein the reception/transmission circuitry communicates via multiple alternative communication technologies and/or operating modes; and positioning means to receive or determine position estimates for the multimode communication device, wherein the memory comprises one or more region definitions, wherein each region definition indicates a name of the region and a list of at least one of the multiple alternative communication technologies and/or operating modes plus an activation range and a deactivation range for the at least one of the multiple alternative communication technologies and/or operating modes, wherein the encoded instructions comprise an activation/deactivation application, execution of which, directs the processor of the multimode communication device to perform the following operations:

determination of a position of the multimode communication device;

retrieval of a stored region definition relating to a region closest to the position of the multimode communication device;

comparison of the position of the multimode communication device with the activation range and deactivation range of the retrieved region definition; and activation and deactivation of at least one of the multiple alternative communication technologies and/or operating modes indicated by the retrieved region definition based on the comparison; and implementation of a time hysteresis, wherein said activation of at least one of the multiple alternative communication technologies and/or operating modes takes place only after the multimode terminal has been inside the activation range for a first predetermined period of time, and deactivation of at least one of the multiple alternative communication technologies and/or operating modes takes place only after the multimode terminal has been outside the deactivation range for a second predetermined period of time.

* * * * *

UNITED STATES PATENT AND TRADEMARK OFFICE
CERTIFICATE OF CORRECTION

PATENT NO. : 8,315,646 B2  
APPLICATION NO. : 12/937738  
DATED : November 20, 2012  
INVENTOR(S) : Karjalainen Page 1 of 1

It is certified that error appears in the above-identified patent and that said Letters Patent is hereby corrected as shown below:

IN THE SPECIFICATION:

Column 8, line 49:

Now reads: "one activation radius 303"

Should read: -- one activation radius 302 --

Signed and Sealed this  
Sixth Day of August, 2013

Teresa Stanek Rea  
*Acting Director of the United States Patent and Trademark Office*